US006938038B2

United States Patent
Weinberg et al.

(12) United States Patent
(10) Patent No.: US 6,938,038 B2
(45) Date of Patent: Aug. 30, 2005

(54) METHOD AND APPARATUS FOR GENERATING AND UTILIZING QUALIFIERS AND QUALIFIED TAXONOMY TABLES

(75) Inventors: Paul N. Weinberg, Los Angeles, CA (US); Dave L. Sullivan, Canoga Park, CA (US); David E. Brookler, Los Angeles, CA (US); Philip A. Tinari, Beverly Hills, CA (US); Eugene Cherny, Sherman Oaks, CA (US)

(73) Assignee: SAP Aktiengesellschaft, Waldorf (DE)

( * ) Notice: Subject to any disclaimer, the term of this patent is extended or adjusted under 35 U.S.C. 154(b) by 391 days.

(21) Appl. No.: 10/172,572

(22) Filed: Jun. 13, 2002

(65) Prior Publication Data
US 2003/0233347 A1 Dec. 18, 2003

Related U.S. Application Data
(60) Provisional application No. 60/386,088, filed on Jun. 4, 2002.

(51) Int. Cl.[7] .............................................. G06F 17/30
(52) U.S. Cl. ................................ 707/4; 707/3; 709/223
(58) Field of Search .......................... 707/4, 3; 709/223

(56) References Cited

U.S. PATENT DOCUMENTS 6,058,391 A * 5/2000 Gardner ......................... 707/4

* cited by examiner

Primary Examiner—Charles Rones
(74) Attorney, Agent, or Firm—Dalina Law Group P.C.

(57) ABSTRACT

An embodiment of the invention comprises a method and apparatus for structuring, storing and retrieving data in database systems utilizing relational objects referred to as qualifiers. Catalog data are segregated into one or more primary tables (e.g., main tables), one or more lookup tables, and one or more qualified lookup tables following a predefined set of categories and a taxonomy. Qualified lookup tables comprise a special type of fields referred to as qualifiers. Searches are conducted in embodiments of the invention by determining a set of lookup fields, performing a lookup in one or more lookup tables, and retrieving data values which include association values with records that belong to one or more primary tables. The qualifiers are then used to narrow the search space by selecting only those values that satisfy the selection criteria with regard to the qualifiers. In embodiments of the invention, only a small set in the primary table are traversed to retrieve eligible records.

31 Claims, 6 Drawing Sheets

METHOD AND APPARATUS FOR GENERATING AND UTILIZING QUALIFIERS AND QUALIFIED TAXONOMY TABLES

This non-provisional application takes priority from U.S. Provisional Application entitled "Method and Apparatus for Generating and Utilizing Qualifiers", filed Jun. 4$^{th}$ 2002, Ser. No. 60/386,088.

BACKGROUND OF THE INVENTION

1. Field of the Invention

This invention relates to the field of computer software. More specifically, the invention relates to a method and apparatus for structuring, storing and retrieving data in databases in a way that improves data management and retrieval.

2. Background

Relational data refers to data where entities are each associated with a set of data elements that are interrelated. For example, a catalog item (the entity) may be associated with a set of attributes (e.g., name, color, manufacturer name, description, etc.). A collection of items forms a database, or a product catalog in this example. The collection of items, in its simplest form, may be stored in a flat file where, for example, lines represent items, also referred to as records, in the catalog and each column represents a data field, or attribute. Modern relational databases use relational database management systems (RDBMS) to store and retrieve data. Modern relational database management systems employ sophisticated data storage and management and have communication means to exchange data with clients. For example, to allow easy access to data records, modem database management systems have the capability to partition the storage media into data pages and index the records into separate indices, which serve as direct pointers to the location of records. Modem database management systems also have the capability to simultaneously communicate with multiple clients through network sockets.

However, relational database management systems use an internal table representation that preserves some aspects of a flat file representation. For example, if a set of records is associated with a given attribute, a table representing all records must contain a field for that attribute. For all of the records that are not associated with that attribute, the value of the field is left empty. When items are retrieved from a single table, the database management system traverses the records in the table, one by one, to retrieve the records, or parts thereof, that fulfill a certain test condition. It is clear that storing and retrieving information from databases that use the single table approach is far from an optimal approach in terms of minimizing the storage space and the computation required for searching and retrieving data.

Modern database management systems provide multiple approaches, such as data indexing, to improve data storage and retrieval. However, with the constantly increasing amount of data and the need for conducting ever more sophisticated and complicated searches on the data, existing computation power may sometimes be unable to keep up with the demands of database processing.

The present invention discloses a data structure and method for storing, managing, and retrieving data from databases that optimizes the amount of storage space and minimizes the amount of computation needed to perform sophisticated searches.

SUMMARY OF THE INVENTION

Figure 1:
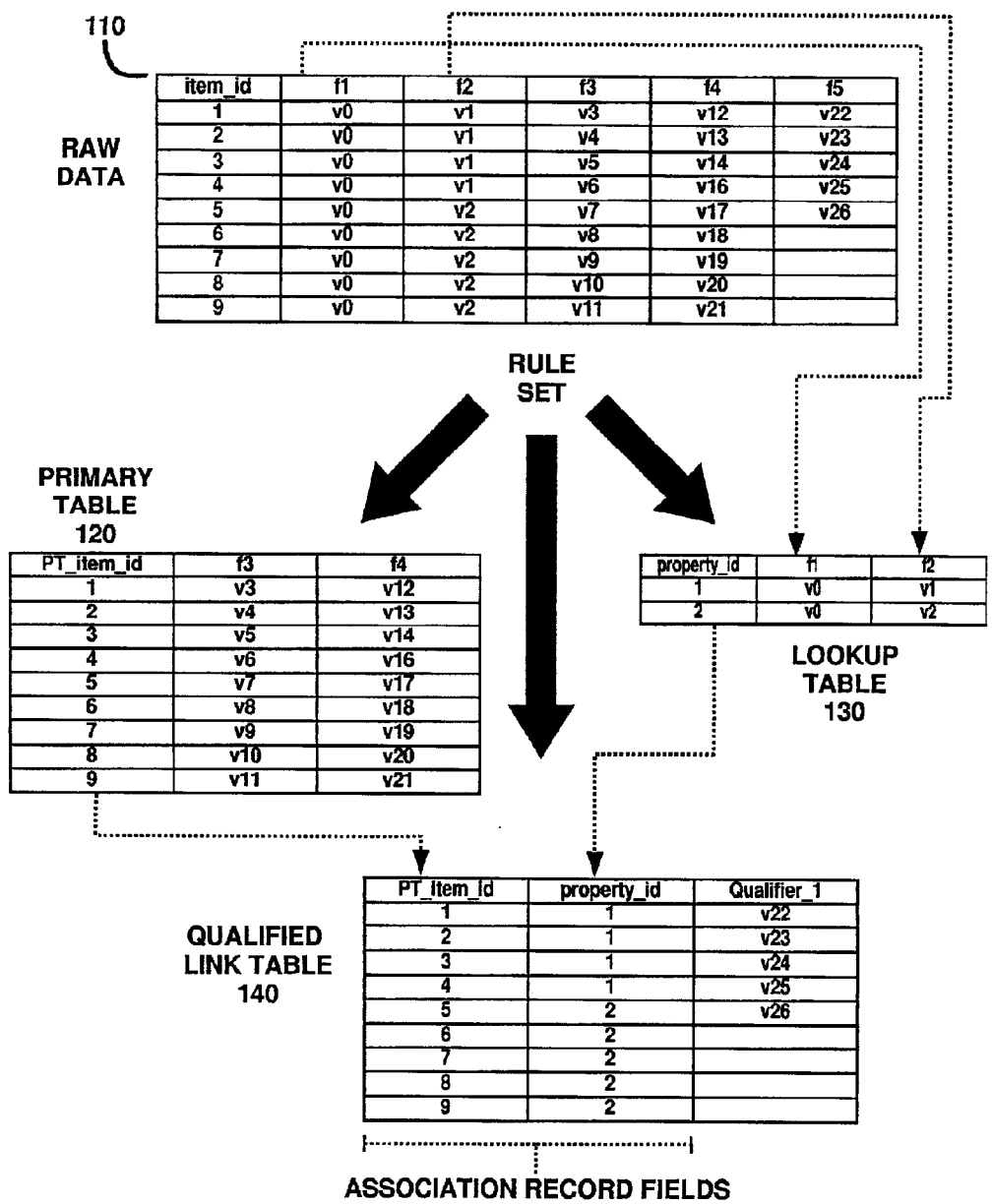
FIG. 1 is a block diagram illustrating the process of organizing data in a database system.

The invention is a method and apparatus for structuring, storing and searching data in database systems using qualifiers. Embodiments of the invention utilize a flexible framework for organizing data that comprises one or more primary tables, one or more lookup tables, one or more link tables, one or more multi value tables, and one or more variable field value tables. These tables are interrelated using qualifiers and thereby organized to provide for the efficient retrieval of information from the tables.

Systems implementing one or more aspects of the invention segregate data fields into sets, depending on the values with which they are populated, and the level of the sparsity that the field values represent. Users may utilize the system to construct lookup tables containing fields that represent the most common values or combinations thereof, which reduces the redundancy in the data set by storing the most common values into the lookup tables. Thus, the system may utilize sparsity values that represent measurements of a frequency of occurrence for a particular data value in accordance with the judgment of the user and/or system. For instance, sparsity values describe the applicability of fields to sets of data records. For example, an attribute that is applicable to five percent of the data records has a higher sparsity value that an attribute that is applicable to ninety percent of the data records.

Data fields representing item-specific field values are used in the primary tables and one or more records, in one or more lookup tables, can be linked with one or more records of the primary table. Furthermore, embodiments of the invention enable users to define data fields that are used in one or more link tables. Link tables provide one or more associations between primary table records and one or more lookup table records. Link tables also provide a place to store qualified data values referred to as qualifiers. In one embodiment of the invention qualifiers are data fields stored in qualified link tables, multi value qualifier tables, and variable qualifier field value tables. A record in the qualified link table represents one association between the primary table and the lookup table and is referred to as a link. Qualified link tables also provide fields referred to as qualifiers. In accordance with one embodiment of the invention, qualifiers are data fields that contain information specific to the links in the link table. A link table containing qualifiers is referred to as a qualified link table and the records in the link table can be referred to as qualified links.

Qualifier fields may represent multiple values for each qualified link. These qualifier fields are referred to as multi value qualifier fields. The values for these fields are stored in a supporting table called the multi value qualifier table. Each record in a multi value qualifier table contains one of the multiple qualifier field values of a qualified link in the qualified link table.

A qualifier field may apply to all links in the qualified link table, or it may apply to a subset of the links depending on some attribute of that link. In one embodiment of the invention, the qualifier fields applicable to any link may depend on the lookup table record referred to by that link. A qualifier field which applies to a subset of qualified links depending on the lookup table record referred to by those qualified links is called a lookup table dependent qualifier field. This commonly happens when the lookup table is a category table, in which case these qualifier fields are called category dependent qualifier fields. The values of lookup table dependent qualifier fields are stored in a variable qualifier field value table. Each record in a variable qualifier field table represents one value of a lookup table dependent qualifier field for a qualified link in the qualified link table. The structure of the variable qualifier field table allows it to store values for all lookup table dependent qualifier fields of a qualified link table with the same data type. One embodiment of the invention accomplishes this by using one column in the variable qualifier field table to store the lookup table dependent qualifier field identifier and one or more columns to store the value of that field. Multiple lookup table dependent qualifier field values of a qualified link may be stored in the variable qualifier field table by using a single record to store each of the multiple values.

The use of such qualifiers and the way the data structure described herein is arranged provides the system with an efficient mechanism for performing multi-level searching into database tables. The search process segregates search parameters according to the field categories. The system conducts a search on the primary table records by traversing one or more qualified link tables along with their associated multi value qualifier tables and variable qualifier field tables. For each link table traversed, the system returns a set of records containing a set of associations that meet the subset of the search criteria that applies to the associations in that link table. The sets of associations returned for each qualified link table are utilized in conjunction with other search criteria determine the applicable set of primary table records. By using a subset of a data set to further search the data at each level of the search, embodiments of the invention allow for a significant reduction of the searched subsets of records, which in turn results in an increase in search performance for large amounts of data.

Users may use aspects of the invention to conduct drill-down searches by using the result of one iteration of a search as an input to a subsequent search. Thus, a second search can be performed within the context of a first search. For instance, the system may be configured to perform a search for a sub-set of catalog data using a first lookup in the sub-tables, a second lookup in the qualified link table and a third lookup in the primary table. The data structure disclosed in the invention allows for a fast drill-down search, since each lookup field may be used to access lookup tables while restricting the search using the search parameters and qualifiers.

DETAILED DESCRIPTION

An embodiment of the invention is a method and apparatus for structuring, storing and retrieving data in database systems utilizing a data structure of relational objects referred to as qualifiers and/or qualified links. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention. The reader should note that the term system as utilized herein includes both software and hardware embodiments of the invention configured to implement the data structure and/or methods executing in computer memory that is described herein.

Data Structures and Qualifier Generation

Embodiments of the invention provide a mechanism for efficiently retrieving information from a set of tables (e.g., a primary table, a lookup table, and a qualified link table). In one or more instances the invention utilizes a system configured to generate and utilize qualifiers and qualified links to define the relationships between the data stored in the tables. Qualified links are described throughout this disclosure as relational objects, such as relationship attributes, allowing associations between one or more records in one or more database tables. These qualifiers and qualified links are utilized in accordance with one embodiment of the invention to manage catalog data (e.g. information about a set of offered products and the attributes associated with each product). However, the qualifiers, the qualified links, and other aspects of the data structure described herein may be utilized to manage data in any database system. Each qualifier provides link specific information that defines an association between at least two records. The qualified link utilizes the qualifiers and the link information to represent a well-defined set of information about how records interrelate to one another. Qualifiers and qualified links provide the system with a mechanism for effectively representing complex relationships and efficiently retrieve data that is associated with such relationships.

FIG. 1 is a block diagram illustrating the process of organizing data in a database system, in accordance with embodiments of the invention. Table 110 represents a typical set of relational data, such as the raw data of a catalog. Relational data is characterized by one or more attributes associated with items in the data set. For example, in a data set containing catalog data, each item is associated with one or more attributes, such as manufacturer name, color, price, etc. In the illustration of FIG. 1, each column of table 110 represents an attribute associated with at least one item in the data set. Each row in table 110 represents an entry in the data set. In the context of relational databases, a data entry is referred to as a record, or tuple, and the attributes are referred to as fields.

Relational data are generally represented using a two dimensional representation, with columns as attributes and rows as records. For example, data may be stored in a flat file, having fields separated by a separator, such as a comma or semi-colon, and records separated by end-of-line indicators or any other delimiter. A data set, such as the one represented in table 110, may be stored in a relational database using the same two-dimensional format as the flat file. As table 110 illustrates, some fields may have a few common values or combinations of values (e.g., v1 and v2 in table 110). For example, in a catalog the number of suppliers of manufactured items may be limited to a few suppliers. In a two dimensional representation format, repeating common values across multiple records that share that value wastes space. In addition, because of the size of the data set, the required processing power for data management is inflated. For example, items 1 through 9, in table 110, all share the value v0 for field "f1" and items 1 through 4 all share the value v1 for field "f2". In other instances field values are left empty as in the case of an attribute that does not apply to an item (e.g., field "f5" for items 6 through 9 in table 110).

Embodiments of the invention utilize two or more relational data structures in database systems to optimally store and retrieve relational data. The system implementing the invention allows the user to build one or more field categories. Field categories are utilized to construct database tables. In the example of FIG. 1, the system constructs one or more primary tables 120. A primary table is typically constructed with fields that represent the lowest level of sparsity and the lowest level of redundancy in respect to the raw data. For example, the primary table 120 is constructed using fields "f3" and "f4", which hold non-redundant information and has the least sparsity in respect to the other data fields in the data set. Embodiments of the invention generate a unique key (PT_item_id in 110) to identify each record of table 110.

In addition to primary tables, the system is configured to construct one or more lookup tables, also referred to as sub-tables. For example, in FIG. 1 fields "f1" and "f2" are combined into a lookup table 130, which has only two value combinations corresponding to the most redundant value combinations found in the raw data of 110. The lookup table 130 has one or more records and each record is identified with a unique key ("property_id" in 130). Lookup tables are constructed to hold structures, also referred to as lookup data or lookup records (e.g., sub-table records), that are common to multiple records in the primary table. Embodiments of the invention use the field categories that have substantially redundant values or combinations thereof to construct the lookup tables.

Systems implementing one or more aspects of the invention construct a type of table referred to as qualified link tables, association tables or link tables 140. A qualified link table is constructed using the unique key from the primary tables and the unique key from one or more lookup tables. Each record contains the keys from a record in the primary table and a record in a lookup table, reflecting an association between records in those tables. The relationship between the primary table and the lookup table is a one-to-many relationship. Each record in the qualified link tables may also be identified with a unique key. Thus, the qualified link table contains a set of qualifier fields (also referred to as qualifiers) and association record fields, wherein each of the plurality of association record fields provides an association between at least one record in the primary table and at least one record in the lookup table (e.g., sub-table). For instance, an association record links two or more records from other tables through the use of a key (e.g., a foreign key). A simple association comprises two fields for holding, respectively, two primary keys each of which is from a different table. The qualified link table may also contain a plurality of the least used data values in the catalog data (or some other data set).

In addition to holding an association between primary tables and lookup tables, qualified link tables are constructed in accordance with one embodiment of the invention by using qualifier fields. Qualifier fields can be selected by users or by an automatic process that selects fields that present sparsely attributed values in the raw data. In either instance, the system provides a mechanism for efficiently representing complex relationships while requiring minimal input from users.

For example, in FIG. 1 field "Qualifier_1" is equivalent to field "f5" in the source data 110. Qualifiers, or qualifier fields, in combination with the association are used at data search and retrieval time to further narrow the search within the database tables (see below for further details).

Figure 2A:
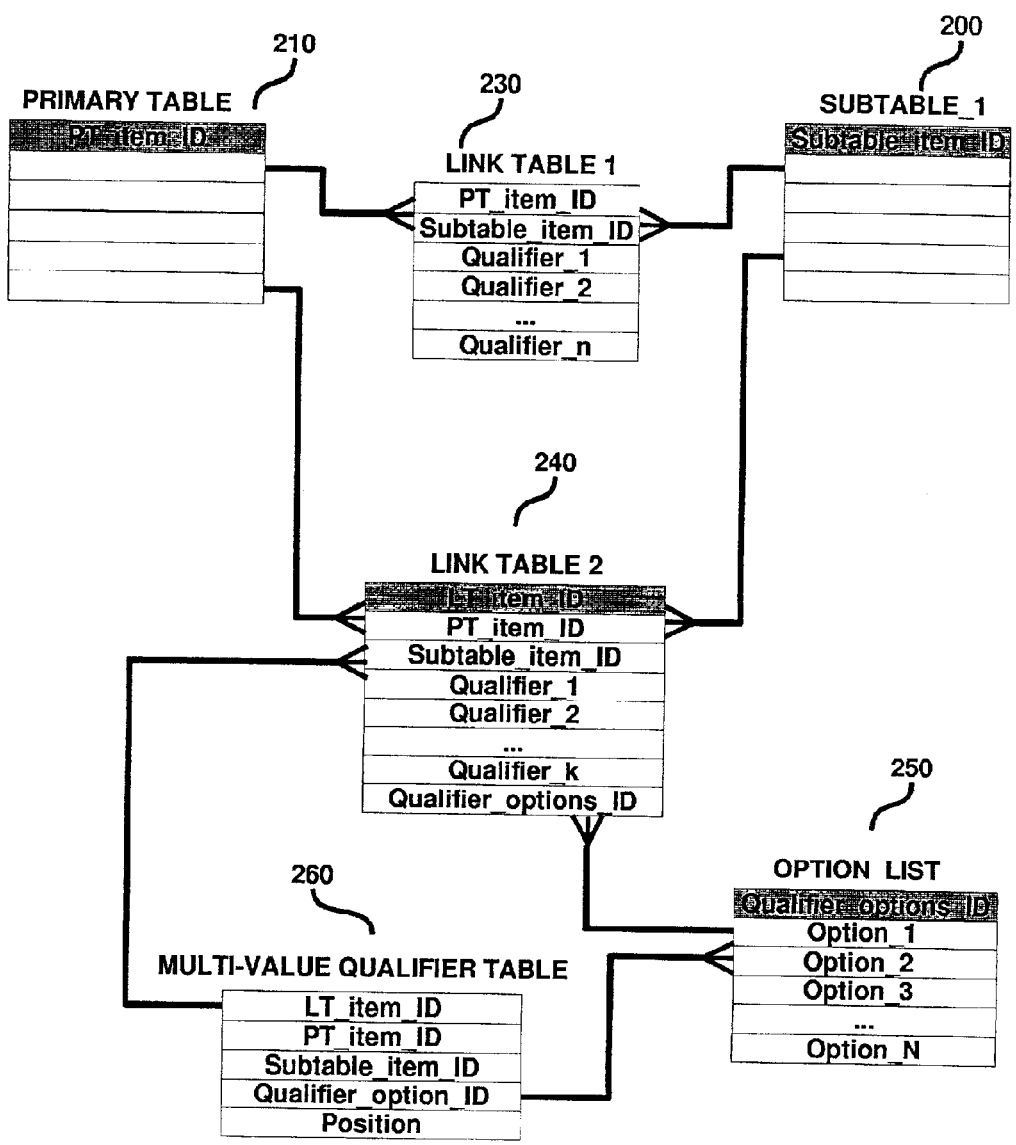
FIG. 2a is a block diagram illustrating several types of database tables and their relationships.

FIG. 2 is a block diagram illustrating several types of database tables and their relationships, in accordance with one or more embodiments of the invention. FIG. 2a illustrates the relationship between a primary table 210, a sub-table 200 (e.g. becomes a lookup table, qualified lookup table, or qualified taxonomy table), a qualified link table 1 230, a qualified link table 2 240, an option list 250, a multi value qualifier table 260.

Primary Tables

In embodiments of the invention, one or more primary tables 210, or main tables, are constructed using data fields that typically possess a low level of sparsity. In instances where the system is handling catalog information, the primary table may be a flat table whose fields are common to all products in the catalog. For each field, a determination is made as to how to represent the data in the field, the data type stored in the field and whether the field should be a lookup field, i.e., a field for which the list of legal values is stored in a separate table. For example, a typical product may have the following fields: Item Number, Product Name, Price, Description, Category and Manufacturer.

Flat and Hierarchical Lookup Tables

One or more subtables 200 also referred to as lookup tables, 200 are constructed using the distinct set of values of one or more fields in primary table 210. Each distinct value or value combination becomes a record in lookup table 200 and the matching values in the field or combination of fields in primary table 210 are replaced by an identifier value that references the record in the lookup table 200. In accordance with one embodiment of the invention categories of fields for which a small set values or a combination thereof constitute a significant percentage of the values in the initial data set. These categories enable users with the ability to select fields, or categories of fields, to be used for building lookup tables. The invention also contemplates utilizing a method for automatically defining the set of fields, and category of fields, based on the content to be used as lookup table fields.

In embodiments of the invention, lookup table 200 is used to store values shared by many records in other tables and also to act as a valid table that defines the set of legal values of the corresponding lookup field for data entry and search. For example, a single manufacturer is typically associated with many product records. By storing manufacturer data in lookup table 200, users have the ability to edit a single copy of the manufacturer data, which simultaneously updates all records referencing that single manufacturer record.

The system may build lookup table 200 for storing lookup values in a simple flat table or in a hierarchical table. For example, hierarchical tables may be constructed using parent-child relationships between records in the hierarchical table (e.g., fields and subfields). In an embodiment of the invention, a determination is made as to whether a given lookup field looks up into a flat or hierarchical table. For example, the Manufacturer field in the primary table is typically a lookup field, with the manufacturer data stored in a lookup table. Furthermore, the manufacturer lookup table should be hierarchical if, for example, the manufacturer has subdivisions. However, the invention also contemplates the use of other data arrangements.

Taxonomy Lookup Tables

Taxonomy lookup tables which are an extension of hierarchical lookup tables are used in accordance with one embodiment of the invention. Taxonomy lookup tables are used to represent product information from varying sets of fields such that the set of fields that applies to a product depends on some categorization of the product. For example, the circular bearing category of products may have an inner diameter field while the motor category of products has a horsepower field. Product categories and subcategories, along with the associations between categories and subcategories and category dependent fields, are represented in a hierarchy as a taxonomy table. The taxonomy table is a lookup table that provides entries for each pre-defined category and subcategory. The taxonomy also provides the ability to add and modify the set of categories and subcategories, along with all associations between categories and subcategories and the category dependent fields. Taxonomy tables are interchangeably referred to as category tables.

Qualified Lookup Tables and Qualified Link Tables

The system may construct one or more qualified link tables, such as 230 and 240, using associations between primary tables and lookup tables (200) (e.g., qualified lookup tables). Lookup table 200 may be referred to as qualified lookup table 200 when it is associated to its primary table through qualified link table 230 and/or 240. In FIG. 2a, for example, two (2) link tables 230, 240 are constructed. Qualified link table 230 contains the first key (field "PT_item_ID") that holds a pointer to a record in the primary table and a second field ("Subtable_item_ID") that holds a pointer to a record in the qualified lookup table. In the example of FIG. 2a, qualified link table 230 also contains a number of qualifier fields (e.g., qualifier_1 through qualifier_n) selected by a user or by an automatic process. FIG. 2a also shows qualified link table 2 240, which possess similar attributes compared to qualified link table 1 230 but also has a unique key field LT_item_ID. Qualified link table 2 240 further illustrates that a qualified link table may be related to another type of table referred to here as an option table, or option list 250. Typically, when a qualifier field possesses more that one value option in a subtable, embodiments of the invention may construct an option table holding the different value options available for the qualifier fields. For example, option table 250 may contain information defining the various choices or alternatives available for a particular product. If a product comes in different color or models, option table 250 may contain information defining the various combinations of color and model that are available. In one embodiment of the invention, option table 250 is a lookup table that contains records referred to by identifiers in the associated qualifier lookup field of qualified link table 2 240.

Multi Value Qualifier Tables

When a qualifier lookup field needs the ability to contain multiple lookups into a lookup table 250 it is referred to as a multi-valued qualifier lookup field. The associations between the qualified link containing the qualifier field and the values of this multi-valued qualifier lookup field are stored in one embodiment of the invention in an additional table 260. This table is referred to as a multi value qualifier table 260. It is logically an extension of the qualified link table 240 because it stores data values that are part of the qualified link. This requires that the qualified link table have a primary key (LT_item_ID) so that the qualified links may be identified and associated to the lookup table.

Qualified Taxonomy Tables and Variable Qualifier Field Tables

Figure 2B:
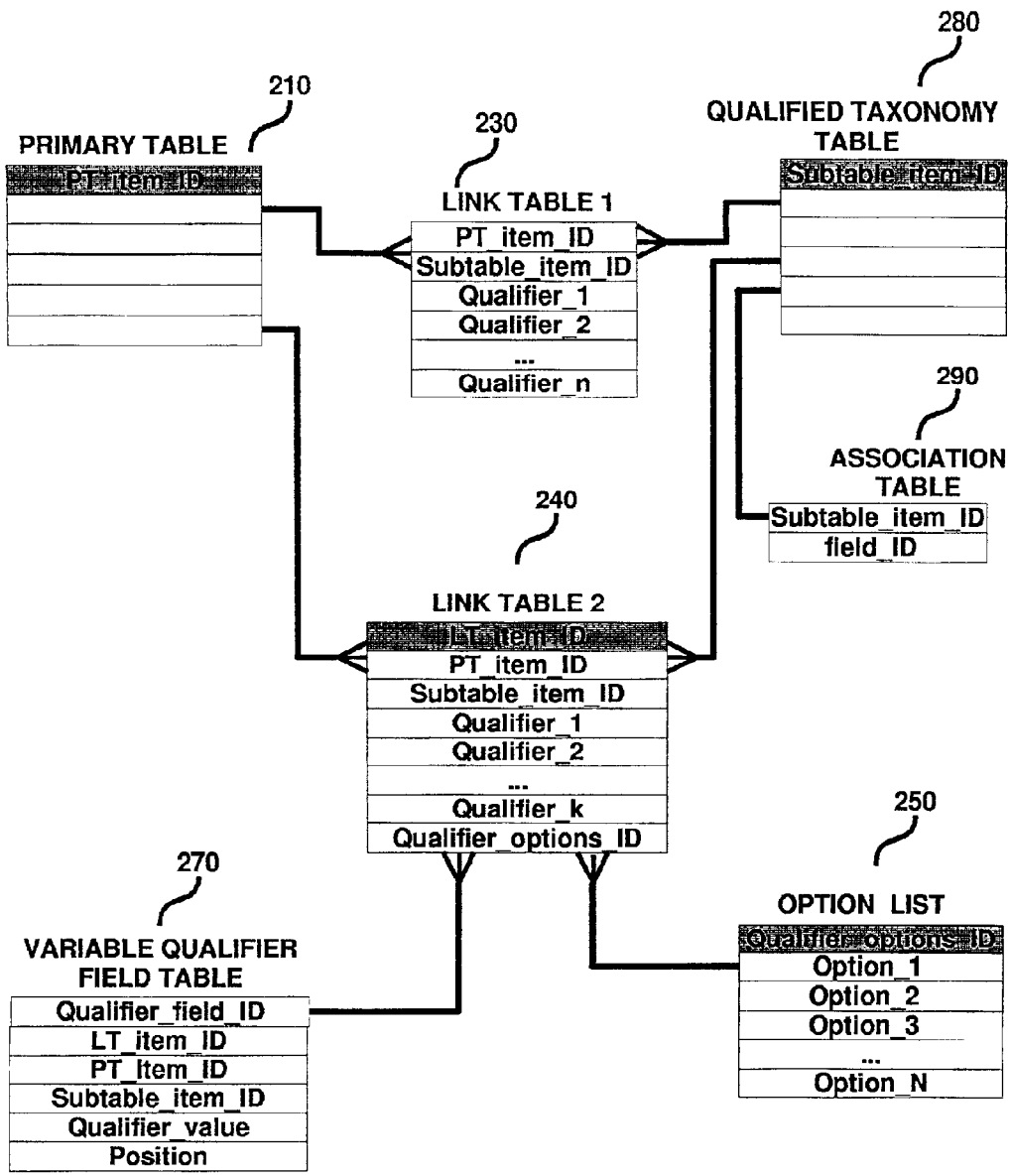
FIG. 2b is a block diagram illustrating a configuration for extending the capabilities of the qualified link tables.

FIG. 2b illustrates a configuration for extending the capabilities of the qualified link tables. The system may construct one or more variable qualifier field tables 270 to extend the capabilities of qualified link tables. When a taxonomy lookup table (e.g., subtable 200) is associated to its primary table through a qualified link table that is extended by a variable qualifier field table, the taxonomy table is referred to in one embodiment of the invention as a qualified taxonomy table 280.

Qualified taxonomy tables 280 allow category dependent sets of primary table record to taxonomy table record link specific fields of information to be represented. When a primary table 210 record is associated with a qualified taxonomy table 280 record, a qualified link is created in the qualified link table 240. The taxonomy table record linked determines which category dependent qualifiers apply to this link. The values for these category dependent qualifiers are stored in the variable qualifier field table. One embodiment of the invention further restricts the qualified links from a primary table to qualified taxonomy table 280 such that all qualified links from any one primary table record associate this primary table record with the same qualified taxonomy table 280 record.

The structure of a qualified lookup table (e.g., subtable 200) varies depending on the number of fields that represent lookup fields of the primary table. Embodiments of the invention, with two (2) or more such fields, make each field a single-valued lookup field of the qualified lookup table. The qualified lookup table will contain a record for each combination of lookup values, and will support a multi-level search-within-a-search capability in the qualified lookup search in the primary table. Embodiments of the invention with exactly one such field make that field a non-lookup field of the qualified lookup table. The qualified lookup table will contain a record for each lookup value and will a support single-level drill-down search in the qualified lookup search in the primary table.

When no qualified lookup table fields should represent lookup fields in the primary table, the system may define a dummy non-lookup field in the qualified lookup table, define all the other fields as qualifiers, and not make the dummy field into a display field. The qualified lookup table will contain a single dummy record, making it memory efficient, that links to the qualifier values that contains the actual subtable information. This approach provides no lookup value selection when specifying the values for a qualified lookup field during data entry and no validation against subtable lookup or records, because all the information is stored as qualifiers.

Figure 3:
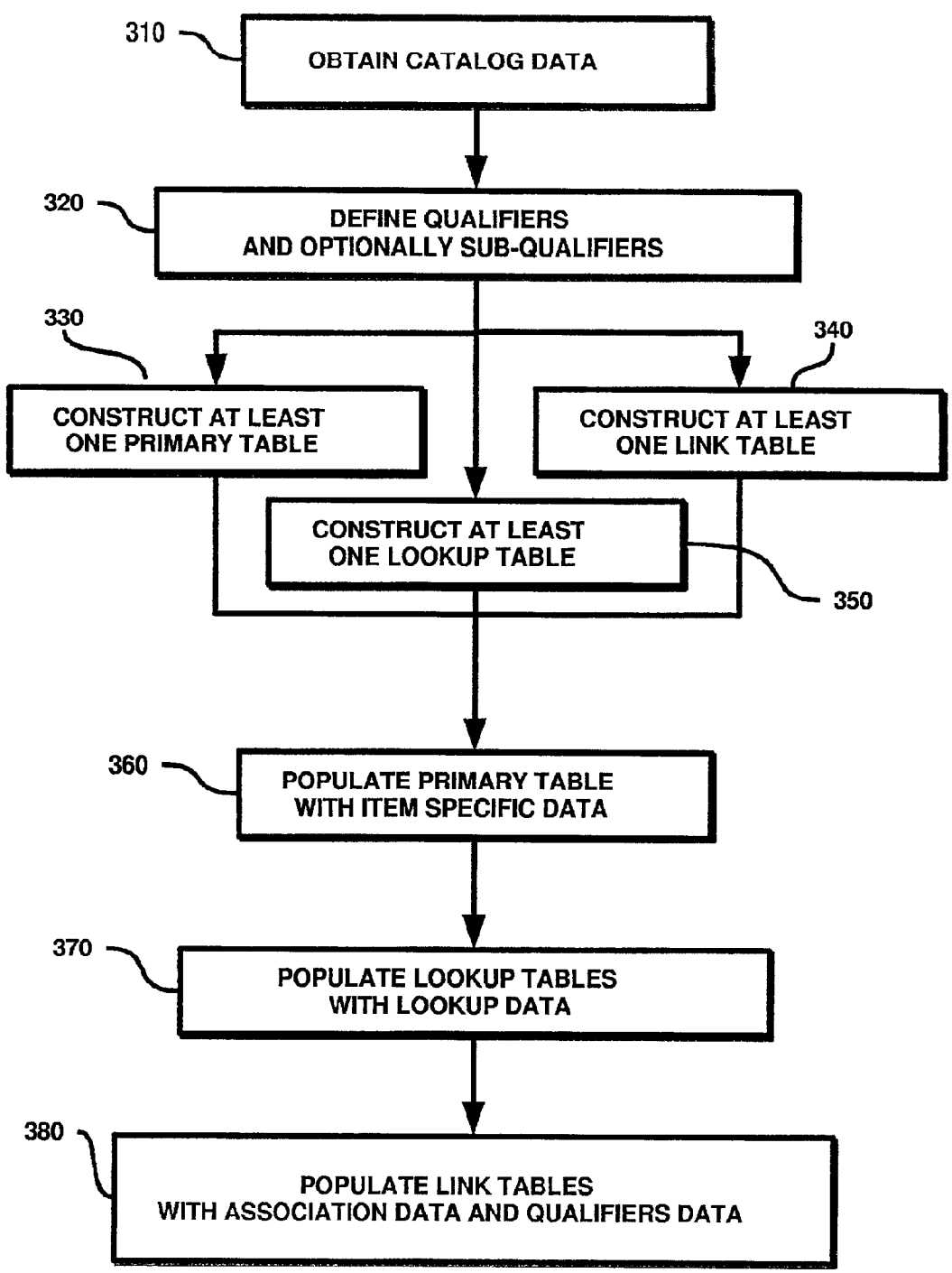
FIG. 3 is a flowchart illustrating steps for building a set of tables for efficiently storing, searching and retrieving data in database systems.

FIG. 3 is a flowchart illustrating steps for building a set of tables for efficiently storing, searching and retrieving data in database systems, in accordance with embodiments of the invention. At step 310, embodiments of the invention obtain relational data. The relational data may contain catalog data (or any other types of data). Typically, the catalog data contains a set of items of manufacture, or products, where each item of manufacture is associated with one or more attributes. An attribute may contain any property that specifically describes the item of manufacture or describes a relationship of the item of manufacture with any other product. For example, attributes describing a product comprise a name, a list of suppliers, and a description of the attribute's physical layout, such as color, mass, etc. Attributes describing a relationship between products comprise any attribute that defines the links between a products and other products or applications. For example, an oil filter may be linked to specific vehicles, but only applies when the engine type is a V8. In this case the attribute "engine type" further defines the relationship between the oil filter and the specific vehicles. A sealant may be described both as a product for sealing pipes and as a glue.

Catalog data may be obtained in any form for exchanging data. For example, catalog data may be obtained in a data file stored on a file storage medium such as a magnetic disk. Data files may also be obtained through a network data stream. The system implementing one or more aspects of the invention may also be enabled to obtain data from one or more tables stored in one or more database systems.

The system may allow users, through a user interface or through an automatic system, such as an automatic computer program, to perform a pre-processing step. For example, the user selects one or more fields to be ignored during the import step. A system implementing the invention may also be configured to automatically insert identifiers to identify each data record.

At step 320, qualifiers are defined and optionally sub-qualifiers (e.g., additional information stored in option table 250) are optionally defined. Step 320 processes the data obtained to determine one or more sets to be used as qualifier fields in qualified link tables. The system may require the creation of new tables or altering one or more existing tables. For example, if a set of data contains one or more categories of items, embodiments of the invention may alter one or more qualified lookup tables, qualified link tables, and/or taxonomy tables.

At steps 330, 340 and 350 the system constructs at least one primary table, at least one qualified link table and at least one qualified lookup table, respectively. Steps 330, 340 and 350 may include multiple independent data processing steps. For example, the processing steps may include checking the data type and running a validity check in view of existing fields in the database tables. In other instances, data processing steps, such as the checking of data integrity, are performed on the data before storing and/or altering existing tables.

Data integrity and data validity checking may follow a pre-defined set of rules (e.g., a rule set) introduced by the user on a case-by-case basis, or may be provided as a set of algorithmic rules implemented in computer programs and automatically run on the data set. For instance, the rule set may contain at least one rule for selecting fields from the catalog data when the fields have redundant data values. The rule set may also define a plurality of combinations of the redundant data values. In one embodiment of the invention, a rule set is an ensemble of rules used to segregate data fields into lookup table fields and qualifiers. In other instances, rule sets are utilized to choose among data fields (e.g., qualifiers), those which are considered for selection criteria.

At step 360, systems implementing one or more aspects of the invention populate the primary tables with data obtained from a data source, after checking for validity and data integrity. At step 360, the primary table is populated with specific data and a unique identifier is automatically generated for each record constructed from the source data. At step 370, lookup tables are populated with lookup data obtained from the data source and combined into records that hold a reduced set of shared values, or a set of combinations of values shared among records in the primary tables. Step 370 also includes associating a unique key with each of the lookup tables' records. Likewise, if lookup table fields are associated with other fields (i.e., in a one-to-many relationship), the system may construct the hierarchy of tables holding the associated data and populate those tables while generating a unique key for each one of their records.

At step 380, link tables are populated with association data and qualifiers data. The system may populate the qualified link tables, at step 380, by storing the data obtained from the data source in the appropriate qualifier fields. An association is created between records in primary table and records in lookup tables by inserting the unique key of a record from the primary table in a first key location and the unique key of a record of a lookup table in a second key location. Step 380 includes other processing steps that allow for populating a hierarchy of tables. In one embodiment of the invention, the system provides a mechanism for performing a search that allows the user to link the primary table record to the qualified lookup table record by searching for and selecting a single qualified lookup table record from the smaller set of qualified lookup table records, linking to the qualified lookup table record, and then entering data values for each of the qualifier fields for that link between the primary table record and the instance of the single selected qualified lookup table record. As described above, qualified lookup tables may be associated with other lookup tables.

Searching and Retrieving Data from Data Structures

Figure 4:
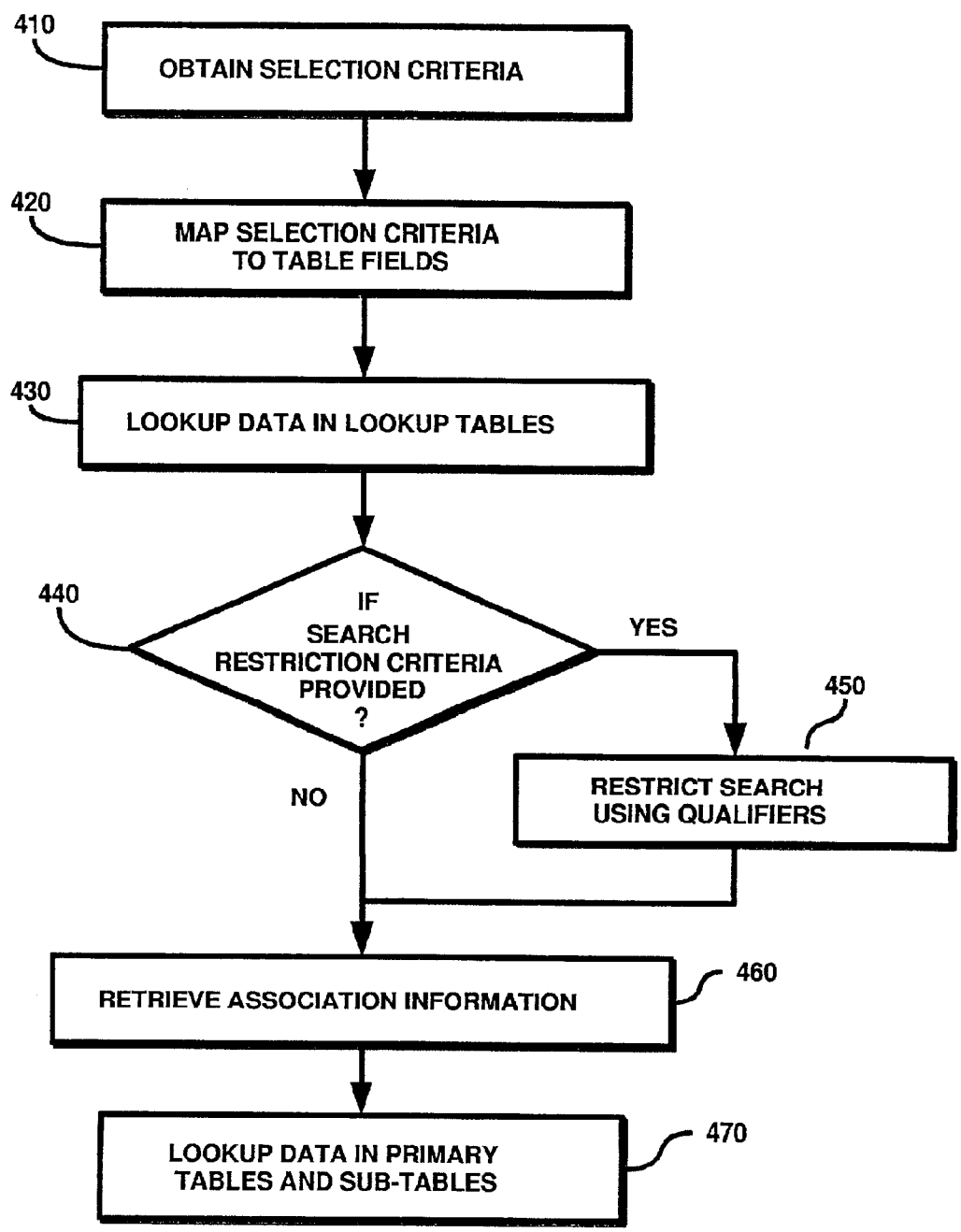
FIG. 4 is a flowchart illustrating steps involved in performing a search and retrieving data from a database system.

FIG. 4 is a flowchart illustrating the steps involved performing a search and retrieving data from a database system, in accordance with one or more embodiments of the invention. Selection criteria are obtained at step 410 where the system executing the process described herein may provide a user with a graphical interface to enter commands to query a database. User commands may be as simple as point-and-click commands on a displayed data point within a data structure. Embodiments of the invention provide the user with one or more layers for interpreting user-triggered events and producing literal commands that can be interpreted by one or more database systems. For example, a user interface may translate a point-and-click command issued by a user within a data structure, displayed on a screen, into Structured Query Language (SQL) commands that select the values of fields associated with the selected field in a hierarchical structure. Step 410 may also involve running pre-configured tasks that allow a database system that is a part of the user interface to manipulate the data. For example, the user interface may be connected with one or more modules capable of caching queries and results of queries. If a user repeats a commands within a certain period of time, or simply if a determination is made that the data has not been updated since a previous query, the interface may serve data to the user in response to the query from the cached data, which results in an increased performance in response latency.

At step 420, selection criteria are mapped to table fields by analyzing the query to determine a mapping between the queried fields and the tables containing the fields. Step 420 also includes allowing sub-queries to access one or more lookup tables to retrieve data records that satisfy a first set of conditions associated with lookup table lookups, given the rule sets associated with the field categories and the field taxonomy.

At step 430, lookup tables are used to lookup data by accessing one or more lookup tables to retrieve data records. The system may traverse one or more lookup table hierarchies to retrieve the appropriate records. Each of the retrieved records contains a unique identifier.

At step 440, the initial query is analyzed to determine whether the query provides search restriction criteria to apply to the query. Typically, the restriction criteria involve fields that are determined to be qualifiers. If search restriction criteria are not provided, the process proceeds directly to step 460. If search restriction criteria are provided, the process proceeds to step 450 and then to step 460. At step 450, the parameters, or qualifiers, for restricting the search are determined. The parameters may involve traversing the hierarchy of qualified lookup tables and their associated tables to determine the fields that are to be considered in subsequent searching steps.

At step 460, association information is retrieved by accessing one or more qualified link tables using a set of restriction values for specific qualifiers and the set of unique keys retrieved from lookup tables at the previous step 430.

If the qualified link tables are not empty, the result of the query provides a set of associations where each association links a record from a lookup table to a record in the primary table. If multi-valued qualifiers are included in the search, the multi value qualifier tables associated with the qualified link table may also be accessed to further limit the set of applicable associations where each association links a record from a lookup table to a record in the primary table.

At step 470, data lookup occurs using primary tables and subtables. Embodiments of the invention in step 470 use the set of associations retrieved at step 460 to access a primary table and retrieve the set of items in the primary table that satisfy the search criteria.

The previous section describing FIG. 4 discusses a search on the primary table and summarizes how using qualifiers instead of lookup table fields can make it easier to enter related information for a primary table record, by first picking from a small set of common information stored in the lookup table records, then filling in the specific information into the qualifiers. An alternative to this approach is to move all qualifier fields into the lookup table, resulting in an explosion of lookup table records. Although the lookup table will then contain all the information needed to perform a search it may be cumbersome to find an exact record within the table and increases the chance a new record will need to be created in the lookup table because none of the existing records contain the exact combination of values needed to link to the primary table record.

Nested Lookups and Multi-Level Search-Within-A-Search

Lookup fields (or sub-table fields) are fields of the lookup table/sub-table and may be defined in the primary table and in lookup tables. For example, the "Manufacturer" field in the primary table may require a lookup into the Manufacturers table of legal manufacturer names, and the State field in the Manufacturers table may in turn require a lookup into the States table of legal two-letter state abbreviations.

Each lookup field in a lookup table may appear not only as a search tab when the current table accessed by the user is the lookup table, but also within the search tab for the primary table lookup field when the current table is the primary table for the multi-level "search-within-a-search." It is note worthy that a single nested lookup field allows the primary table lookup field to support search-within-a-search. Multiple nested lookup fields not only support search-within-a-search, but also allow the lookup table to act as a valid table that defines specific value combinations among the values of each of the multiple nested lookup fields.

Performing a Drill-Down Search

Systems implementing aspects of the invention can be configured to provide users with the ability to perform a drill-down search. To this end, a user accesses a table with lookup fields (usually the primary table). Drill-down searches use the search capability provided by the user interface, for example, as in the records tabulation mode in the graphical user interface window. Each lookup field has its own search tab for a drill-down search; that is, each search tab corresponds to a field in the table that is a lookup into a subtable. For example, a Manufacturer tab corresponds to the field of the same name that is a lookup into the Manufacturers table; similarly the Category tab corresponds to the Category field that is a lookup into the Categories table.

Product Applications and Application-Based Search

In one or more instances, catalog data containing product information may be represented through the use of a product or its application. Applications are especially important in certain industries where application-driven product selection is in the traditional way to locate products.

With qualified lookup tables the system utilizes a data model for product applications that replaces the traditional single table application-centric view with a product-centric view, using a primary table of products and a qualified lookup table of applications.

The system for managing catalog data may store the list of generic applications in a qualified lookup table, which usually contains multiple lookup fields to define the valid value combinations among them and for "search-within-a-search" from the primary table. Any field of the qualified lookup table may be flagged to be an application-specific qualifier. A qualifier may not apply to the qualified lookup table record by itself, but rather to the association of the qualified lookup table record with a primary table record.

Each record in the qualified lookup table defines a single unqualified application of a product in the primary table; the complete set of qualified lookup table records together comprise the entire universe of valid unqualified applications for all of the products in the catalog.

Applications provide yet another way to locate products within a large catalog of complex product information, so that in addition to a drill-down search by manufacturer, category, attributes, keyword, and other traditional criteria, a user is able to search for products by their application. For example, in an automotive parts catalog, each part may be compatible with one or more vehicles; these vehicle specifications represent the unqualified applications and appear in the qualified lookup table of valid vehicles (the valid table). A user may search for parts within the catalog by the various specifications of a vehicle, such as year, make, model, and engine type.

When a user assigns an unqualified application to a product (by assigning, for example, the qualifier table record to the value of a qualified lookup field in the primary table), a user may also assign a value to one or more application qualifiers. A qualifier is an additional specification for that particular combination of product and application that further defines the unqualified application.

Figure 5:
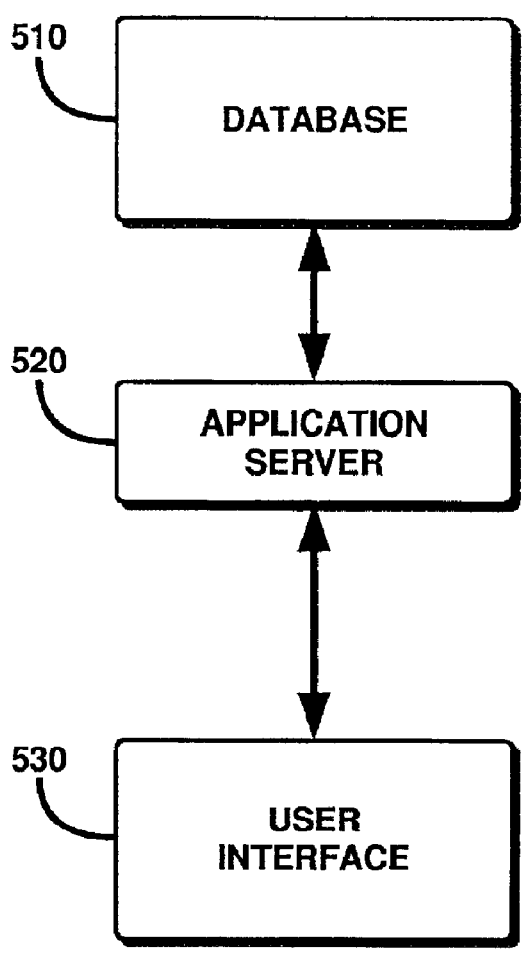
FIG. 5 is a block diagram of a system configuration.

FIG. 5 is a block diagram of a system configuration utilized in one or more embodiments of the invention. The system contains utilizes a database server layer 510, an application server layer 520 and a user interface layer 530. In relatively small systems may be configured to run on the same processor. In other instances, different layers of the system may be configured to run on different processors.

The database server layer 510 may be any of the database management systems that are commercially available. Typically database management systems store data in data pages that are accessed through a database engine. The engine of the database allows communication with clients (e.g., through a network) and keeps data integrity by handling data locking.

The application server layer 520, in embodiments of the invention, performs the multiple tasks of manipulating the data between a database system and the user interface. For example, the application server layer may be enabled to interpret a user's commands entered in graphical mode via the user interface to construct a textual command containing text strings such as SQL commands. The application server layer may also be enabled to cache data from previous queries and serve the data from the cache when appropriate. The user interface 530 provides a high level of flexibility, allowing a user to graphically interact with the data. For example, when displaying a list products stored in the database system, a user may use a simple click of a mouse on an item to view the hierarchical structure below the product. In this case, the graphical interface communicates the user selection event to the application server that interprets the event as a request for viewing the hierarchy. The application server layer constructs the appropriate query to the database utilizing the information stored in the categories tables and the taxonomy. The application server layer then submits the query to the database system and retrieves the data. Based on the hierarchical structure already in place for the retrieved data, the application server layer communicates the data to the user interface which displays the data in adequate format to the user.

In one embodiment of the invention, the system utilizes search within a search to allow a user to link a primary table record to a qualified lookup table record without having to search the entire set of qualified link table records for an existing qualified link table record. The system can also allow users to link a primary table record to a qualified lookup table record without having to specify values for all of the fields and qualifier fields.

The system may utilize a layered approach to represent the complex set of product information. In one embodiment of the invention, the layered approach utilizes the following tables and provides the following benefits.

Main Table:
  one product per main table record
  stores information that applies to the product independent of any association to other products, categories, applications or any other object represented in the catalog Taxonomy Table:
  efficiently stores category-specific information
  reduces number of fields in main table records Qualified Table:
  still one product per main table record
  small number of category-independent qualifiers
  custom information on a per-link basis
  efficiently stores link-specific information without duplicating main table information Qualified Taxonomy Table (Single Valued Attributes) [For Product Variations]
  now one product per qualified table link
  actual SKU represented by each link
  many category-specific qualifiers
  efficiently stores category-specific link-specific information without duplicating main or lookup table information
  reduces number of fields in qualified link table records
  supports searching against all product variations despite small main table Qualified Taxonomy Table (Multi-Valued Attributes) [For Configurable Products]
  multiple products per qualified table link
  one or more virtual SKUs represented by each link
  built-up part number capability
  out-of-the box product configurator with no rules-based programming supports searching against all product configurations despite small main table and small qualified link table.

Qualified Taxonomy Table Example Usage

Embodiments of the invention provide the capability to flexibly represent multiple product variations and configurable products by using a qualified taxonomy table. Specifically, products that may have one or more configurations may be represented with a given identification in the main table and associated with a category in a qualified taxonomy table. In other instances products may have different identifications because, although very similar, they present one or more variations. In one embodiment of the invention, the system is configured to provide for the layering of one-to-many qualified capabilities onto a taxonomy table. For instance, multiple qualifiers can reference the same record, thereby providing a flexible mechanism for representing the various permutations associated with that record. Thus, when multiple aspects of a data set relate to a single product that can be configured in multiple ways or the same product has multiple variations (size, color, type, etc. . . . ).

These and other benefits are achieved to represent information about a product or some aspects of a product (e.g. a SKU) through the use of qualified lookup tables, single and multi-valued qualifier fields, qualified taxonomy tables, and single and multi-valued category dependent qualifier fields.

An Example of Specific SOL Structures Supporting the Use of Qualifiers

The following illustrates an example implementation configured in accordance with one embodiment of the invention. Two tables referred to but not shown are A2i_CM_Tables and A2i_CM_Fields. The A2i_CM_Tables associates table Ids with a description of the tables (e.g. it holds the table name and table type). The A2i_CM_Fields table associates field Ids with a description of the fields (e.g. it holds the field name, field type, and field type specific information such as lookup table Id for lookup fields, or the dimension of measure for measurement fields).

Example of Direct Data Tables

These tables contain all non-qualifier information about products. Primary and lookup tables are included in the class of Direct Data Tables These tables are named:

A2i_x: where x is the Id specified in the TableId field of A2i_CM_Tables. In typical usage, when there are multiple tables having this form, one table is considered the main table with the remainder acting as lookup tables. Every direct data table has the following fields:

| Field Name | Field Type | Description |
| --- | --- | --- |
| Id | Int 4, not NULL, Primary Key | Id of the record. Valid Id's start at 1 for new records |
| PermanentId | Int 4, not NULL | Ever increasing Id used to make sure newly added records are not confused with previously deleted records that had the same id. |
| Fy | Varies by user defined field type | Single value User defined fields with Direct Data Table Association (Qualifier fields exist in the Qualified Link table or its supporting tables). y is the field Id as defined in the A2i_CM_Fields table. See field schedule for description |
| Uy | Int 4, not NULL | For Measurement fields, this holds the Units value. y is the field Id as defined in the A2i_CM_Fields table |

Create a Primary, unique valued, clustered index on Id
Create a Unique Valued Index on PermanentId Every primary table has a permanent NULL record with Id=0 and all fields set to the default value for that field type. This NULL record is needed because any table can be a lookup for another table. On initial record creation for a table, all fields must contain valid values. This means all lookup fields must link to an actual record in another table.

By default they link to this empty record. User defined fields have field names Fy where y is the FieldId defined in the A2i_CM_Fields table. We have several reasons to use field names Fy instead of more human friendly names like 'Color field'.

Performance. We only need to know the Id of a field to access it. This results in less storage in the server and client components and small network packets. It also speeds up the search for a particular field.

Cross Database independence. This format is valid for SQL databases, Codebase, MS Access or any other standard database system. We use each database simply as a container. By storing the field names in a table, we guarantee that all names will comply with naming conventions on the various database systems used.

Example of Qualified Link Tables:

Qualified lookup fields do not have physical fields in their primary data table. The associations to the qualified lookup table are stored in a qualified link table.

The Qualified Link Tables are Named

A2i_x_y: where x is the TableId of the primary table and y is the FieldId of the qualified lookup field. The table structure is as follows:

| Field Name | Field Type | Description |
| --- | --- | --- |
| LinkId | Int 4, not NULL, Primary Key | Unique Id identifying the link. |
| Id | Int 4, not NULL | Id of an existing Id in the A2i_x where x is the same value as in this table's name. |
| SubId | Int 4, not NULL | SubId. Must specify an existing Id in the Qualified Lookup table A2i_n where n is the TableId of the Qualified Lookup table being used. |
| Fz | Varies by user defined field type | User defined qualifier fields. z is the field Id as defined in the A2i_CM_Fields table. See Qualifier Field schedule for descriptions. |

Create a Unique index on LinkId.

Create a non-Unique clustered index on SubId to speed searching.

Create a non-Unique index on Id.

Create a Unique index on LinkId, Id, SubId for use as a primary key.

Create a non-Unique index on all Boolean and lookup fields for faster searching.

Create a Foreign Key on Id referencing A2i_x(Id).

Create a Foreign Key on SubId referencing A2i_n(Id) where n is the TableId of the Qualified Lookup table being used.

Example of Multi Value Qualifier Tables:

Multi-valued Qualifier fields each require a supporting table as defined below.

A2i_x_y_z: where x is the TableId of the table containing the Qualified Lookup field, y is the FieldId of the Qualified Lookup field, z is the FieldId of the Qualifier field.

| Field Name | Field Type | Description |
| --- | --- | --- |
| Id | Int 4, not NULL, Primary Key | Id of an existing Id in the A2i_x where x is the same value as in this table's name. |
| SubId | Int 4, not NULL | SubId. Must specify an existing Id in an Qualified Lookup table A2i_n where n is the TableId of the Qualified Lookup table being used. |
| LinkId | Int 4, not NULL | Link id in the Qualified Link table A2i_x_y |
| QId | Int 4, not NULL | Id of the lookup record in the lookup table that this Qualifier field looks up into. The lookup table may be a direct data table or an object table (image, pdf, movie, etc) |
| QPosition | Int 4, not NULL | The position of the lookup value for this LinkId. | non-Unique clustered index on SubId
non-Unique index on Id
non-Unique index on LinkId
non-Unique index on QId
Foreign Key constraint from (LinkId+Id+SubId) to A2i_x_y.(LinkId+Id+SubId)

Example of Variable Qualifier Field Tables

Variable Qualifier Field Tables each require one or more of the following tables to support the category dependent qualifier field values.

A2i_QC_x_y

A2i_QCN_x_y

A2i_QF_x_y

: where x is the TableId of the table containing the Qualified Lookup field and y is the FieldId of the Qualified Taxonomy Lookup field. These three tables allow the storage or measurement data types, coupled measurement data types and pick list data types. Other tables may be used for additional data types.

| Field Name | Field Type | Description |
| --- | --- | --- |
| Id | Int 4, not NULL, Primary Key | Id of an existing Id in the A2i_x where x is the same value as in this table's name. |
| SubId | Int 4, not NULL | SubId. Must specify an existing Id in an Qualified Lookup table A2i_n where n is the TableId of the Qualified Lookup table being used. |
| LinkId | Int 4, not NULL | Link id in the Qualified Link table A2i_x_y |
| QFieldId | Int 4, not NULL | Id of the category dependent Qualifier field. |
| QValue | Varies depending on the type of the Qualifier fields | The actual field value for this category dependent qualifier field for this instance of the primary table to taxonomy table association. In the case of multi-valued qualifier fields, there may be more than one value. |
| QPosition | Int 4, not NULL | The position of the lookup value for this LinkId. Positions start at zero. Multi-valued qualifier fields may contain more than one value and therefore have multiple position values. | non-Unique clustered index on SubId
non-Unique index on Id
non-Unique index on LinkId
non-Unique index on QFieldId
Foreign Key constraint from (LinkId+Id+SubId) to a2i_x_y (LinkId+Id+SubId)

Thus, an example of a method and apparatus for structuring, storing and retrieving data using qualifiers has been described. The invention, however, is defined by the claims and the full scope of any equivalents.

What is claimed is:

1. In a computer system, a method of organizing catalog information in a database structure to provide access to said catalog information comprising: obtaining a set of catalog data;
   obtaining a set of qualifier fields in said set of catalog data using a rule set comprising a first set of sparsity values associated with each one in said set of qualifier fields;
   obtaining a set of lookup fields in said set of catalog data using said rule set comprising a plurality of second sparsity values associated with each one in said set of lookup fields;
   obtaining at least one primary table;
   obtaining at least one sub-table comprising said set of lookup fields having at least one relationship with said at least one primary table, wherein each of said lookup fields comprises legal values, wherein said at least one sub-table comprises at least one sub-table record having sub-table fields containing legal combination for said catalog data;
   obtaining a qualified link table per said at least one sub-table wherein said qualified link table comprises said set of qualifier fields and a plurality of association record fields, wherein each of said plurality of association record fields provides an association between at least one record in said at least one primary table and at least one record in said at least one sub-table;
   performing a search for a sub-set of catalog data using a first lookup in at least one of said plurality of sub-tables, a second lookup in said at least one qualified link table and a third lookup in said at least one primary table.

2. The method of claim 1 wherein said rule set further comprises at least one rule for selecting fields from said catalog data when said fields comprise redundant data values.

3. The method of claim 1 wherein said rule set further comprises at least one rule for obtaining a plurality of combinations of said redundant data values.

4. The method of claim 1 wherein said sparsity values further comprises user judgment.

5. The method of claim 1 wherein said sparsity values further comprises measurements of a frequency of occurrence for each data value.

6. The method of claim 1 wherein said at least one primary table and said plurality of sub-tables are linked through a primary key and a foreign key relationship.

7. The method of claim 1 wherein said plurality of sub-tables further comprise fields containing plurality of data values common to records in said catalog data.

8. The method of claim 7 wherein said obtaining said plurality of sub-tables further comprises populating said plurality of sub-tables with said data values that are common to records in said catalog data.

9. The method of claim 8 wherein said obtaining said populating said plurality of said sub-tables further comprises populating said plurality of sub-tables with a plurality of valid combinations of said data values.

10. The method of claim 1 wherein said at least one qualified link table further comprises fields containing a plurality of least used data values in said catalog data.

11. The method of claim 10 wherein said obtaining said at least one qualified link table further comprises populating said at least one qualified link table with said plurality of least used data values in said catalog data.

12. The method of claim 1 wherein said plurality of association record fields further comprise a primary key and a foreign key relationship.

13. The method of claim 1 wherein said at least one sub-table is used as a lookup table of legal values.

14. The method of claim 13 wherein said legal values further comprise one or more combination of said legal values.

15. The method of claim 1 wherein said data values common for each link between a primary table record and a lookup table record and the additional data values that are different for each link between a primary table record and a lookup table record are stored in the fields of two different tables.

16. The method of claim 1 wherein said obtaining said at least one primary table further comprises creating at least one database table.

17. The method of claim 1 wherein said obtaining said at least one primary table further comprises altering at least one database table.

18. The method of claim 1 wherein said obtaining said at least one primary table further comprises automatically creating a record in the qualified link table when a primary table record is linked to an instance of a qualified lookup table record.

19. The method in claim 1 wherein said performing a search further comprises allowing a user to link a primary table record from said at least one primary table to a qualified lookup table record without having to search the entire set of qualified link table records for an existing qualified link table record.

20. The method in claim 1 wherein said performing a search further comprises allowing a user to link a primary table record from said at least one primary table to a qualified lookup table record without having to specify values for all of the fields and qualifier fields.

21. The method in claim 1 wherein said performing a search further comprises allowing a user to link the primary table record to the qualified lookup table record by instead searching for and selecting a single qualified lookup table record from the much smaller set of qualified lookup table records, linking to the qualified lookup table record, and then entering data values for each of the qualifier fields for that link between the primary table record and the instance of the single selected qualified lookup table record.

22. A computer memory for storing data for access by an application program being executed on a data processing system comprising:
   a data structure stored in said computer memory where said data structure comprises information resident in database used by said application program and including:
   a primary table having a primary table key field, at least one lookup field, and a plurality of primary table records wherein each of said plurality of primary table records contains a first unique key value for said primary table key field, and a first subset of values stored in said at one least one lookup field wherein said first subset comprises unique values obtained from a set of raw data;
   at least one sub-table having a sub-table key field, at least one sub-table field, and a plurality of sub-table records wherein each of said plurality of sub-table records contains a second unique key value for said sub-table key field, and a second subset of values from said set of raw data, said second subset of values comprising a first unique combination of values where each value of said first unique combination belongs to one of said at least one sub-table field;

at least one qualified link table having a first qualified link table field, a second qualified link table field, and at least a third qualified link table field, wherein a qualified link comprises said first qualified link table field and said second qualified link table field, said at least qualified link table containing a plurality of qualified link table records wherein each of said plurality of qualified link table records contains said first unique key value and said second unique key value for said qualifier, and said at least said third qualified link table field comprising a third subset of values from said set of raw data, wherein said third subset of values comprises a unique combination of sparse values where each value of said unique combination of sparse values belongs to one of said at least said third qualified link table field;

said application program configured to obtain lookup criteria and access said at least one sub-table to obtain a subset of said plurality of sub-table records using a first portion of said lookup criteria;

said application program configured to obtain a set of said second unique key value from said subset of said plurality of sub-table records;

said application program configured to obtain a subset of said plurality of qualified link table records using said set of said second unique key value and a second portion of said lookup criteria;

said application program configured to obtain a set of said first unique key value from said subset of said plurality of qualified link table records; said application program configured to use said set of said first unique key value to obtain a subset of said plurality of primary table records from said primary table.

23. The computer memory of claim 22 wherein said unique combination of sparse values comprises a combination of redundant legal values.

24. The computer memory of claim 22 wherein each of said plurality of qualified link table record comprises a combination of qualifier field values that corresponds to a link between said primary table record and an instance of at least one of said plurality of qualified lookup table records.

25. The computer memory of claim 22 wherein said at least one sub-table a number of qualified lookup table records less than the plurality of records of said primary table.

26. The computer memory of claim 22 wherein said at least one sub-table field in said at least one sub-table is designated as said qualifier and configured to become said qualified link table field.

27. The computer memory of claim 22 wherein said qualifier comprises selection criteria for selecting a subset from said at least one sub-table.

28. The computer memory of claim 22 wherein said at least one sub-table field complements said at least one lookup field.

29. The computer memory of claim 22 wherein said first unique key and second unique key comprises an association.

30. The computer memory of claim 22 where said association comprises a many-to-many relationship.

31. The computer memory of claim 22 wherein said qualified link comprises a non-NULL value from said set of raw data.

* * * * *